United States Patent [19]

Steere, Jr.

[11] 4,014,311
[45] Mar. 29, 1977

[54] HYDRAULIC BLADE MOUNT

[75] Inventor: Robert E. Steere, Jr., Boonton, N.J.

[73] Assignee: Silicon Technology Corporation, Oakland, N.J.

[22] Filed: Aug. 19, 1975

[21] Appl. No.: 605,856

[52] U.S. Cl. .................................. 125/15; 269/22; 279/4
[51] Int. Cl.² ......................................... B28D 1/04
[58] Field of Search ...................... 51/73 R; 125/15; 269/22; 279/4; 92/84

[56] References Cited

UNITED STATES PATENTS

| | | | |
|---|---|---|---|
| 2,843,151 | 7/1958 | Greenawalt | 92/84 |
| 3,130,978 | 4/1964 | Roojen | 279/4 |
| 3,827,421 | 8/1974 | Schumacher | 51/73 R X |

*Primary Examiner*—Harold D. Whitehead
*Attorney, Agent, or Firm*—Amster & Rothstein

[57] ABSTRACT

An improvement is provided in an apparatus for mounting and tensioning an inside diameter cutting blade which is mounted in a circular saw blade housing. The outer circumference of the blade is clamped within a mounting apparatus. Pressurized hydraulic fluid within a channel exerts pressure against the blade radially inward of the clamping means by exerting pressure on a fluid-tight gasket which, in turn, bears against the blade. By virtue of the uniform pressure distribution throughout the fluid, uniform tensioning of the blade is accomplished. The improvement comprises constructing the gasket in two pieces with an outer sleeve which contacts the hydraulic fluid, and which while deformable, is fixed relative to the housing, and a filler ring mounted within the sleeve and which is relatively movable with respect thereto. The improved gasket reduces the amount of fluid necessary, reduces set-up time and permits use of a filler ring which is more resilient than the outer sleeve and which, consequently, does not take as great a "set" thereby increasing the useful life of the gasket.

9 Claims, 5 Drawing Figures

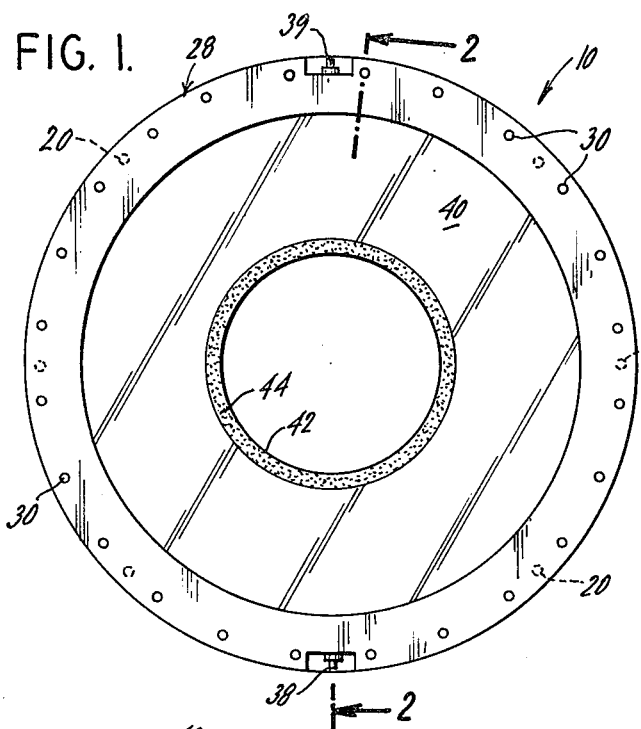
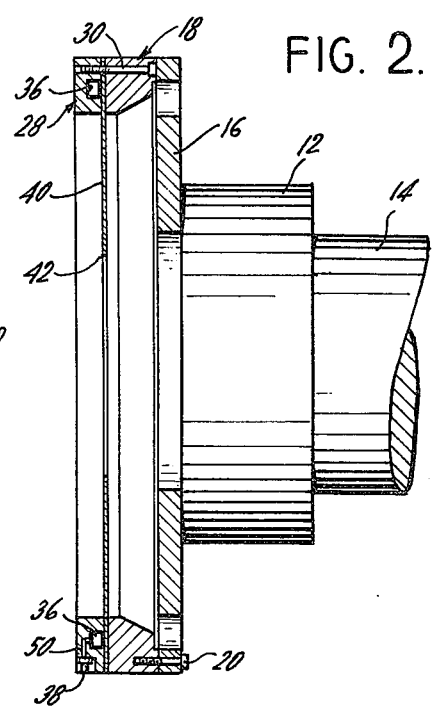
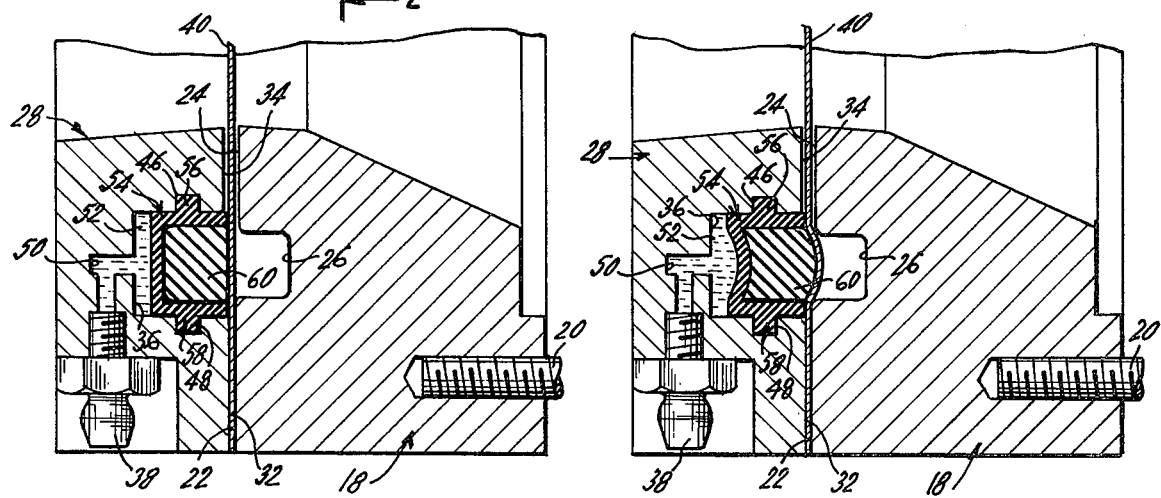
FIG. 3.
FIG. 4.
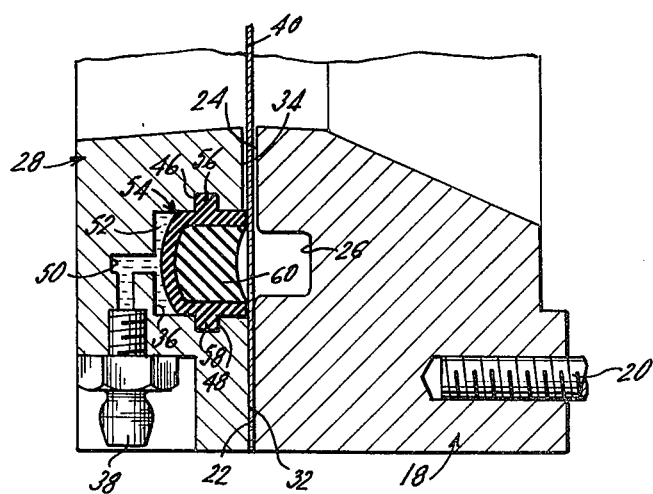
FIG. 5.

HYDRAULIC BLADE MOUNT

The present invention relates generally to article tensioning devices, and in particular, to an improvement in an hydraulically operated article tensioning device.

In recent times, the use of extremely thin silicon wafers in the electronics industry, typically on the order of 0.007 inches thick, has been on the increase. While there are numerous different methods available for forming silicon wafers of the required thickness, such wafers are usually cut from large silicon crystals grown specifically for the purpose of providing material for the formation of the required thin wafers.

The diameter of the specially-grown crystals often approximates three inches and, in order to assure uniform performance of the product in which the silicon wafers are utilized, uniform size and surface configuration of the wafers is extremely important. Formation of the wafers from the large silicon crystals with the repeatability and reliability necessary for mass production has required a special cutting blade to be devised to produce the required smooth, unscarred crystals while minimizing waste of the expensive silicon material.

The required cutting blade must be thin enough to provide the desired thin wafer while minimizing waste and must also have the rigidity required to slice through a three inch diameter crystal. Normal cutting blades or saws do not provide the required rigidity, with the required thinness necessary to minimize waste of material.

In order to provide a cutting blade with the required characteristics of thinness, rigidity and cutting depth capability, circular saw blades which are quite thin are clamped about their circumference and provided with a central opening. The blade thus formed is mounted on a saw blade housing which clamps the periphery of the blade thus forming what is referred to as an inside diameter saw blade (hereinafter sometimes referred to as an "ID" blade).

In view of the commercial importance of providing automatic or semi-automatic machinery for producing thin silicon wafers from large silicon crystals in commercially required quantities, machines have been developed for mounting and appropriately tensioning ID saw blades with accuracy as well as in a fashion that is repeatable with the same accuracy.

For some time it has been recognized that the application of mechanical tensioning forces to provide the required tension on the ID saw blade once it was clamped, was unsatisfactory. Among the reasons for the unsatisfactory results obtained from mechanical tensioning is the difficulty in uniformly tensioning the saw blade at the various circumferential locations for the clamping housing. In addition, rapid, repeatable tensioning of the saw blade is difficult if not impossible.

Recently, it has been recognized that the characteristic of hydraulic fluid of uniform pressure transmittal could be utilized in uniformly tensioning a clamped ID saw blade. In its broadest form, the idea of hydraulically tensioning an ID saw blade includes mechanically clamping the blade in a housing and forcing hydraulic fluid to impinge upon the blade, either directly or through an intermediate medium, to uniformly tension the clamped blade.

The disadvantages of directly contacting the ID saw blade with hydraulic fluid (such as shown in U.S. Pat. No. 3,556,074) are discussed in U.S. Pat. No. 3,827,421 which issued Aug. 6, 1974 and which has been assigned to the assignee of the present invention.

In U.S. Pat. No. 3,827,421, the teaching of which is hereby incorporated by reference, a solution is presented for solving the problem of direct contact of an ID saw blade by the hydraulic tension fluid. In the '421 patent, a gasket is placed within a hydraulic tensioning fluid groove and prevents direct contact of hydraulic tensioning fluid with the inside diameter saw blade.

While the apparatus shown and described in the '421 patent is certainly a great improvement over the prior art apparatus, it does have certain disadvantages. For example, when pressure is applied to the hydraulic fluid in the apparatus shown in the '421 patent and the gasket is deformed under the action of the hydraulic fluid which, in turn, deforms the blade in the tensioning operation, the gasket naturally deforms as well. Once the saw blade shown in the '421 reference dulls and requires changing, it is necessary to release the pressure on the hydraulic fluid and remove the blade. During the period of time that the gasket has been under pressure from the hydraulic fluid and has been deformed, it may very well have acquired a "set" or permanent deformation in the direction of the deformation. The reason for the gasket acquiring a set is that the gasket, which is typically made of polyurethane material, must be of a durometer to withstand the large hydraulic pressure forces bearing thereagainst and consequently cannot be too resilient. When a new or reconditioned saw blade is inserted into the apparatus of which the tensioning device is a part, the "set" of the gasket shown in the '421 reference causes some initial undesired and uncontrolled deformation of the saw blade.

In addition, as may be noted by reference to FIG. 3 of the '421 patent, the configuration of the gasket and the fluid cavity shown therein is such that complex machining of the fluid cavity and complex forming of the gasket is required due to the geometry thereof. This geometry increases machining time for formation of the fluid cavity; and, the fairly complex shape of the gasket increases the cost of the apparatus beyond what is would be if the shape of the cavity and the gasket were simplified.

Further, if after a gasket shown in the '421 reference which had acquired a "set" was required to be removed from the fluid cavity, re-installation of the gasket after it had acquired a "set" would be difficult and would require some additional time for re-installation.

Naturally, such additional time increases the cost of the finished item produced by a machine which requires that such time be spent in view of the decreased rate of production of such a machine and the increased expense involved due to the personnel required to operate the machine.

It is an object of the present invention to provide an improved apparatus for hydraulically tensioning a saw blade while avoiding direct contact between hydraulic fluid and the saw blade.

It is a more particular object of the present invention to provide a gasket for preventing contact between hydraulic tensioning fluid and a saw blade which gasket is formed of two parts which are relatively movable with respect to one another.

It is a still more particular object of the present invention to provide an improved blade mounting and tensioning apparatus wherein hydraulic tensioning fluid is prevented from contacting a saw blade by a gasket comprised of an outer sleeve of a deformable material of a given resiliency which gasket includes a filler ring within the sleeve which filler ring is formed of a more resilient material than is the sleeve.

In accordance with a specific embodiment of the present invention an improvement in a blade mounting and tensioning apparatus includes first and second annular clamping members. Means are provided for clamping the periphery of a blade between the clamping members. An annular fluid channel is formed within the first clamping member and is located radially inward of the clamping means. The annular fluid channel has an opening which confronts one side of the blade. An annular recess channel is provided within the second clamping member which is radially aligned with the annular fluid channel and which has an opening therein which confronts the other side of the blade. A deformable gasket is located within the annular fluid channel opening. There is an hydraulic fluid in the annular fluid channel and the gasket is constructed and arranged to seal the hydraulic fluid within the annular fluid channel against contact with the blade. The gasket is further constructed and arranged to bear against a clamped blade upon pressure being exerted on the fluid whereby the pressure uniformly deforms the gasket against the blade and thereby uniformly deforms the blade into the recess channel and results in a uniformly tensioned blade. The improvement comprises forming the deformable gasket of an outer sleeve and an inner filler ring located within the outer sleeve. The outer sleeve is substantially fixed relative to the apparatus and the inner filler ring is constructed and arranged to be movable relative to the outer sleeve upon the fluid within the annular fluid channel being pressurized and deforming the outer sleeve thereby causing the filler ring to bear against and tension the saw blade.

The above brief description, as well as further objects, features and advantages of the present invention will be more fully understood by reference to the following detailed description of the presently perferred, but nonetheless illustrative embodiment, in accordance with the present invention, when taken in conjunction with the accompanying drawing, wherein:

FIG. 1 is a front view of a saw blade and a saw blade housing of the present invention;

FIG. 2 is a sectional view taken substantially along the line of 2—2 of FIG. 1 and looking in the direction of the arrows;

FIG. 3 is an enlarged fragmentary sectional view of the saw blade housing of FIG. 1 with the two-part gasket of the present invention shown without the hydraulic fluid being pressurized;

FIG. 4 is a view similar to FIG. 3 with the hydraulic fluid shown pressurized and the two-part gasket deformed therefrom; and, FIG. 5 is a view similar to FIG. 3 with the filler ring of the two-part gasket shown in a reversed position.

Referring now specifically to the drawing and first to FIGS. 1 and 2, in accordance with an illustrative embodiment demonstrating objects and features of the present invention, there is provided a saw blade housing, generally designated by the reference numeral 10, which is attached, by means of a hub 12 to a drive shaft 14 of a slicing machine (not shown).

It is to be understood that while the blade tensioning device of the present invention is described as useable with an ID cutting blade for slicing thin sections of a silicon crystal, such a use is merely illustrative of the application of the present invention and other applications thereof are possible and are considered to be within the contemplation and scope hereof.

In the preferred embodiment, a spindle plate 16 is shown attached to the hub 12 by any conventional means. A generally cylindrical, annular tensioning ring 18 is attached to the spindle plate 16 by a plurality of tensioning ring bolts 20 which are circumferentially spaced about the saw blade housing and which pass through openings therein and are received within threaded openings in the tensioning ring. The tensioning ring 18 is thereby securely fastened to the spindle plate 16.

The tensioning ring 18 includes a radially outer clamping surface 22 which is best seen by reference to FIGS. 3, 4 and 5. The clamping surface 22 extends axially a given distance from the spindle plate 16. The apparatus 10 includes a non-clamping or clearance surface 24, which is best seen by reference to FIGS. 3, 4 and 5, and is located on the tensioning ring 18 radially inward of the clamping surface 22. The clearance surface 24 of the tensioning ring 18 similar to the clamping surface 22, extends axially from the tensioning ring 16 an axial distance which, however, is less than the distance of axial extent of the clamping surface 22.

Also located within the tensioning ring 18 is an annular tensioning ring recess channel 26 which is generally U shaped in cross-section with the open part of the U facing axially outwardly from the spindle plate 16, with the parallel sides of the U contiguous to and forming the end boundary of each of the clamping and clearance surfaces 22, 24, respectively, of the tensioning ring 18.

An annular clamping ring 28, of substantially the same diameter as the tensioning ring 18, is removably fixed thereto by means of clamping ring bolts 30 which pass through openings within the tensioning ring 18 and which are threadably received within threaded openings in the clamping ring 18 (see FIG. 2).

The clamping ring 28, in a manner similar to the tensioning ring 18, includes a radially outer clamping surface 32 on the surface thereof which is axially closest to the tensioning ring and which confronts the clamping surface 22 of the tensioning ring. On the clamping ring 28, located radially inward of, parallel to, and confronting the clearance surface 24 of the tensioning ring 18, is a radially inner non-clamping or clearance surface 34. The clearance surface 34 is axially displaced from the clamping surface 32 of the clamping ring 28 in a direction axially spaced from the clearance surface 24 of the tensioning ring 18 which it confronts.

The clamping ring 28 includes an annular, circumferential fluid channel or cavity 36 which is generally U-shaped in cross-section and which is arranged with the open end of the U confronting the open end of the generally U-shaped cavity 26 in the tensioning ring 18. The cavity 36 is generally radially aligned with the cavity 26 and is connected, in a manner described in more detail hereinafter, to inlet and outlet hydraulic fluid valves 38, 39. The parallel sides of the U of the fluid channel 36 are contiguous to and form the respective radially inner and outer boundaries of the clamping ring clamping and clearance surfaces 32, 34 (see FIGS. 3, 4 and 5).

A generally toroidal, plane, saw blade 40 is positioned with locating-pin holes therein (not shown) over locating pins (also not shown) which project from the tensioning ring 18. The clamping ring 28 includes openings therein (not shown) which correspond to the locating pins. During assembly of the subject device, the locating pin openings in the clamping ring are aligned with and placed over the locating pins. Each of the plurality of the clamping ring bolts 30 about the periphery of the saw blade housing 10 are then tightened or torqued to the same value to position the saw blade 40 and clamp the same relative to the saw blade housing.

The saw blade 40 includes an inside diameter cutting edge 42 which includes an amount of diamond bort 44 radially inward of the edge to aid in maintaining the cutting capabilities of the blade 40 even after repeated use. The diamond bort is affixed to the blade 40 in any conventional manner such as by the use of well-known adhesives.

Referring now specifically to FIGS. 3, 4 and 5, the annular toroidal channel 36 is, as noted hereinbefore, generally U-shaped with the top or open end of the U opening toward and confronting the open end of the tensioning ring recess channel 26. Each of the legs of the U-shaped channel 36 includes a radially inner and a radially outer annular recess or groove 46, 48 for a purpose to be described. The bottom end of the U-shaped channel 36 (shown as being to the left and axially outermost of the U in FIGS. 3, 4 and 5) is connected through fluid conduit 50 at a circumferential location within the saw blade housing 10 to hydraulic fluid inlet valve 38. Hydraulic fluid inlet valve 38 may be any conventional type of inlet check valve for the introduction of hydraulic tensioning fluid 52 into cavity 36 through the conduit 50.

Circumferentially spaced approximately 180° within the saw blade housing 10 and specifically within the clamping ring 28 is the hydraulic fluid outlet valve 39 which is connected through a conduit similar to the conduit 50 (which similar conduit is not shown) to the interior of the annular toroidal fluid channel 36. The hydraulic fluid outlet valve 39 may be of any convenient construction and is utilized to permit the exiting from the fluid channel 36 of any air which may be trapped therein upon the introduction into the channel 36 of hydraulic tensioning fluid 52; and, under appropriate circumstances to permit the exiting therefrom of hydraulic fluid 52.

Located within the annular toroidal fluid channel 36 is a generally U-shaped toroidal or annular sealing sleeve 54 which is arranged within the channel 36 and aligned in substantially the same way as the channel; i.e., with the open end of the U of the sleeve 54 confronting the open end of the tensioning ring recess channel 26.

The annular sealing sleeve 54 includes radially inner and outer generally annular projecting ears 56, 58.

The ends of the legs of the U of the annular sealing sleeve 54 (the right-most or axially inner-most ends in FIGS. 3, 4 and 5) and the radially inner and outer projecting ears 56, 58 are configured relative to the radially inner and outer annular recesses 46, 48 so that when the annular sealing sleeve 54 is in place within the annular toroidal channel 36, the end of the radially outermost leg of the sleeve 54 is substantially co-axially extensive with the end of the clamping surface 32 on the clamping ring 28. In addition, in this position, the radially inner leg of the U of the sealing sleeve 54 projects slightly axially past the clearance surface 34 of the clamping ring.

As will be noted by reference to FIG. 3, when the annular sealing sleeve 54 is in place within the annular toroidal channel 36, the part of the channel 36 which is left unfilled by the sleeve 54 is substantially reduced below its normal, unfilled volume. The advantages of this reduction in volume shall be discussed in detail hereinafter.

The material of which the sealing sleeve 54 is constructed may be any resilient material of a fairly stiff durometer and great strength necessitated by the sealing function which the sleeve 54 must perform. While any suitable material may be used so long as it exhibits the required stiffness and strength and is impervious to the hydraulic tensioning fluid 52, in the preferred embodiment the sealing sleeve 54 is fashioned from polyurethane.

Located within the interior of the U defined by the annular sealing sleeve 54 is an annular filler ring 60 which is generally rectangular in cross-section as may be best seen by reference to FIG. 3. The interior of the opening within the U of the annular sealing sleeve 54 is likewise annular and is substantially completely filled by the annular filler ring 60 as may be best seen by reference to FIG. 3.

The filler ring 60 may be made of any suitable material which is resilient. In the preferred embodiment, the filler ring 60 is fashioned of a material which has a higher resiliency than does the sealing sleeve 54. By virtue of this higher resiliency, the filler ring 60 is less likely to take a "set" upon being deformed by pressurization of the tensioning fluid 52 as described in detail hereinafter. In the preferred embodiment the filler ring 60 is formed of a material known as buna N-type rubber though any suitably resilient filler ring that would function in the manner to be described would be acceptable and within the contemplation of the present invention. In addition, it is possible to have the sealing sleeve 54 and the filler ring 60 fashioned of material having the same resiliency.

As may be seen by reference to FIG. 3 and 4 and the comparison thereof, upon the tensioning fluid 52 being pressurized, when a blade 40 is clamped in the saw blade housing 10 the pressurized fluid 52 exerts force on the gasket (which is comprised of the sealing sleeve 54 and the filler ring insert 60) which deforms the sealing sleeve 54 and causes the filler ring 60 to slide therein to the right as seen in FIGS. 3, 4 and 5 (compare FIG. 3 with FIG. 4) and deform as well.

In operation, a blade 40 including the locating pinholes or openings noted hereinbefore is placed with the locating pin openings over locating pins projecting from the tensioning ring 18 when the clamping ring 28 is not attached thereto.

Once the saw blade 40 is in position, the clamping ring 28 is placed in position over the saw blade 40 and the opening within the clamping ring 28 are aligned with the locating pins. The plurality of clamping ring bolts 30 are then threaded into the mating threaded openings within the clamping ring 28 and are torqued to the same value in a sequence and in a manner well-known in the art. This tightening of the clamping ring 28 with respect to the tensioning ring 18 locates the blade 40 fixedly with respect to the saw blade housing 10 though it does not evenly tension the opening 42 in the required manner.

Naturally, prior to placing the clamping ring 28 over the locating pins projecting from the tensioning ring 18, the annular sealing sleeve 54 (which, as may be seen in FIGS. 3, 4 and 5, is generally U-shaped in cross-section) was placed within the annular toroidal fluid channel 36 (which is also generally U-shaped in cross-section as may be seen by reference to FIGS. 3, 4 and 5) with the bottom of the U of the sealing sleeve 54 aligned with, parallel to, and spaced from the bottom of the U of the channel 36 with the open end of the U of the sealing sleeve 54 confronting the blade 40. Installation of the sleeve 54 includes positioning the sleeve so that the radially inner and outer ears or projections 56, 58 are seated within the respective radially inner and outer recesses or grooves 46, 48.

Prior to fixing the clamping ring 28 to the tensioning ring 18, the annular filler ring 60 is placed within the interior or opening of the U of the sealing sleeve 54. As may be noted by reference to FIG. 3, in its "normal" or un-deformed condition, the filler ring 60 is generally rectangular in cross-section and is substantially the same axial dimension as is the interior axial dimension of the opening of the U of the sleeve 54; and, is essentially the same radial dimension thereas as well.

After the blade 40 is in position and the clamping ring 28 including the annular fluid gasket comprised of the sealing sleeve 54 and the filler ring 60 is in place and securely fastened by means of the tensioning ring bolts 30, the annular fluid channel 36 is filled with hydraulic tensioning fluid 52 preferably a water soluble, hydraulic-pressure-transmitting fluid through the hydraulic fluid inlet valve 38 which communicates with the interior of the channel 36 through the conduit 50.

During filling of the annular fluid channel 36 with the hydraulic-pressure-transmitting fluid 52, the hydraulic fluid outlet valve 39 is opened. As noted hereinbefore and as may be seen by reference to FIG. 1, the hydraulic fluid outlet valve 39 is displaced approximately 180° about the circumference of the clamping ring 28 from the hydraulic fluid inlet valve 38. The relative location of the hydraulic fluid inlet and outlet valves 38, 39 permits any air which may be trapped within the annular channel 36 to escape through the hydraulic fluid outlet valve 39 upon the fluid 52 being introduced into the channel 36 for the first time.

As noted hereinbefore and as may be seen by reference to FIG. 3, the position of the sealing sleeve 54 within the channel 36 with the bottom of the U thereof proximate the bottom of the U of the channel greatly reduces the volume of the fluid channel 36 which is available for containment of the fluid 52. The advantage and result of this reduced available volume are discussed hereinafter.

As soon as a certain amount of fluid 52 exits from the hydraulic fluid outlet valve 39 without being mixed with air, it is to be presumed that the available volume of the fluid channel 36 is completely filled with fluid 52 and the hydraulic fluid outlet valve 39 is closed. Subsequently, the hydraulic-pressure-transmitting fluid 52 within the channel 36 is placed under pressure through the hydraulic fluid inlet valve 38. According to well-known laws of physics, the pressure placed on the fluid 52 is equally distributed throughout the fluid and, in virtue of the incompressibility of the walls of the channel 36, the pressure of the fluid 52 is exerted uniformly on the straight or "bottom" part of the U of the sealing sleeve 54 (to the left in FIGS. 3, 4 and 5). In virtue of the resiliency of the polyurethane of which the sealing sleeve 54 is fashioned in the preferred embodiment, the sleeve deforms to the right as shown in FIG. 4 under the action of the pressure on the fluid 52. Deformation to the right as shown in FIG. 4 of the bottom of the U by virtue of the juxtaposition and "fit" of the filler ring 60 within the opening of the sealing sleeve 54 causes the filler ring to likewise move to the right (compare FIG. 3 with FIG. 4).

As may be seen by reference to FIG. 3, when the clamping ring 28 is in position to clamp the saw blade 40, the axially inner face of the filler ring 60 (to the right in FIGS. 3, 4 and 5) abuts the axially outer face of the saw blade 40. Consequently, when the pressurized fluid 52 forces the sealing sleeve 54 to the right and as a result of the resiliency of the material from which the filler ring 60 is formed and further as a result of the juxtaposition of the axially inner face thereof to the blade 40, the filler ring deforms to the right. This deformation of the filler ring 60 deforms the part of the blade 40 with which it is in contact to the right as well, forcing it to protrude into the tensioning ring recess channel 26.

In virtue of the hydraulic fluid 52 applying uniform pressure all about the sleeve 54, the aforementioned juxtaposition of the filler ring 60 within the sleeve 54 and the juxtaposition of the filler ring 60 to the blade, the blade 40 is uniformly tensioned so long as the pressure on the fluid 52 is maintained.

Since the volume of fluid 52 within the channel 36 is relatively small, the amount of time necessary to fill the channel 36 with the required amount of the fluid 52 is greatly reduced when compared with the amount of time necessary to fill the channel with a greater volume of fluid such as would be contained in the channel 36 if the channel sealing member (comprised of the sealing sleeve 54 and the filler ring 60) were not configured and inserted therein as described hereinbefore and shown most clearly in FIGS. 3 and 4. Additionally, the time for changing the fluid is lessened since there is less fluid to remove. Again, when it is necessary to add new fluid, the time to do so is reduced in view of there being less fluid within the channel 36 in view of the construction and arrangement of the sealing sleeve 54 and the filler ring 60.

In addition, since the majority of the channel 36 is occupied by the channel sealing member (comprised of the sealing sleeve 54 and the filler ring 60), the total amount of fluid 52 which is required is greatly reduced resulting in a saving in the cost thereof.

Under normal useage, it is expected that the sealing sleeve 54 and the filler ring 60 will remain in the deformed position shown in FIG. 4 under the action of pressurized fluid 52 for some time during the operation of the machine to which the saw blade housing 10 is attached. When it is necessary to reduce the pressure on the fluid 52 to change the blade 40, the resiliency of the sleeve 54 will, to a certain extent, cause the sleeve 54 to more closely approach the "normal" shape shown in FIG. 3 from the pressurized, deformed shape shown in FIG. 4. However, owing to the requirement that the sealing sleeve 54 directly resist the pressure of the pressurized fluid 52, the material of which the sealing sleeve 54 is formed cannot possess too great resiliency or it would not be capable of withstanding such force. A consequence of this lack of unlimited resiliency is that the sealing sleeve 54 tends to take on a "set" or bow in the direction in which it was last deformed (to the right as seen in FIG. 4).

If the "set" of the sealing sleeve 54, were permitted to remain after the pressure on the fluid 52 is removed, and an old saw blade 40 was removed and replaced with a new saw blade, the "set" of the sleeve 54 would cause an undesirable and substantially un-controlled tensioning force to be applied to the blade 40.

This not-desired, un-controlled deformation resulting from the "set" of the sleeve 54 would be especially pronounced were the sleeve 54 to be positioned with the "bottom" part of the U juxtaposed with respect with the blade 40 such as the arrangement shown in U.S. Pat. No. 3,827,421.

However, in the present invention, the "bottom" part of the U of the sleeve 54 is proximate the "bottom" part of the U of the channel 36 and the filler ring 60 is juxtaposed with respect to the saw blade 40. As noted hereinbefore, in the preferred embodiment, the filler ring 60 is fashioned of a material which is of greater resiliency than is the material of which the sealing sleeve 54 is fashioned. The greater resiliency of the filler ring 60 is possible in view of the fact that the sealing sleeve 54 is presented to the direct pressure from the pressurized fluid 52. Consequently, the filler ring 60 can be of a material having a less stiff durometer than the sealing sleeve 54. The greater resiliency of the filler ring 60 tends to reduce the amount of "set" which it adopts and less, undesired, un-controlled deflection is imparted to a new blade 40 inserted in the saw blade housing 10.

In the event that the filler ring 60 does assume a more or less permanent "set" in the direction of the application of the pressure (to the right on FIGS. 3, 4 and 5) the filler ring 60 can be removed from the opening within the U of the sealing sleeve 54 and the ring 60 can be reversed (compare FIG. 4 with FIG. 5). This reversal of the filler ring 60 within the opening of the U of the sealing sleeve 54 deflects the "bottom" of the U of the annular sealing sleeve 54 (the part thereof to the left in FIGS. 3, 4 and 5) to the left and virtually prevents any pre-formed, un-controlled tensioning forces on a new blade 40 clamped within the saw blade housing 10 prior to application of pressure to the fluid 52, as most clearly seen in FIG. 5.

Once pressure is again applied to the fluid 52 in the manner described hereinbefore, the resiliency of the filler ring 60 permits it to deform to the right and counteract the "set" which it has acquired and assume virtually the same configuration as shown in FIG. 4. This greatly increases the useful life of the filler ring 60 and of the entire sealing gasket or member comprised of the sealing sleeve 54 and the filler ring 60.

A further advantage which accrues from the use of a two-part annular fluid gasket comprised of the sealing ring 54 and a relatively movable filler ring 60, is that the presence of the filler ring 60 mounted within the sealing sleeve 54, and the direction of the mounting of the sealing sleeve 54 actually increase the sealing effect thereof with increased fluid pressure.

In addition, the two piece annular fluid gasket comprised of the sealing sleeve 54 and the filler ring 60 of the present invention permits a less complicated annular fluid channel 36 to be formed that was formed in the hydraulic blade mount shown and described in U.S. Pat. No. 3,827,421. This simplified channel results in reduced cost of the final product.

Further, the existence of an annular fluid gasket comprised of an outer sealing sleeve 54 and an inner filler ring 60, permits the inner filler ring to travel or slide a distance within the sealing sleeve 54 to deform and tension the blade 40 in an amount not previously possible with a single piece annular fluid gasket owing to the limits on resiliency of the single piece annular fluid gasket noted hereinbefore. With the two-piece construction of the annular fluid gasket of the present invention, greater tensioning of the blade is possible and the limits of such tensioning are not as much a factor of the construction of the tensioning device as a function of the material of which the blade 40 is formed.

Naturally, although one particularly preferred embodiment has been illustrated and described herein, variations on the basic construction are possible. For example, the annular sealing sleeve 54 can, if it is properly configured vis-a-vis the channel 36, be reversed therein with the filler ring 60 being inserted within the open end of the U prior to such insertion.

In addition, despite the fact that a generally U-shaped sealing sleeve 54 has been shown, it is possible to have a sleeve which does not include a completely open face but which, instead, is either completely or substantially completely sealed and includes therein a filler ring which is more resilient than the outer sleeve itself. Such a combination gasket would accomplish substantially all of the advantages of the present invention; and can, by proper choice of the geometry of the gasket and the receiving channel be made completely reversible to reduce the undesirable effect of the "set" acquired as a result of prolonged pressurization.

As will be readily apparent to those skilled in the art, the invention may be used in other specific forms or for other purposes without departing from its spirit or essential characteristics. The present embodiment is, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. An improvement in a blade mounting and tensioning apparatus, said apparatus including first and second annular clamping members, means for clamping the periphery of a blade between said clamping members, an annular fluid channel within said first clamping member located radially inward of said clamping means and having an opening therein confronting one side of said blade, an annular recess channel within said second clamping member radially aligned with said annular fluid channel and having an opening therein confronting the other side of said blade, a deformable gasket within said annular fluid channel opening, a fluid within said annular fluid channel, said gasket being constructed and arranged to seal said fluid within said annular fluid channel against contact with said blade and further constructed and arranged to bear against a clamped blade upon pressure being exerted on said fluid whereby said pressure uniformly deforms said gasket against said blade thereby uniformly deforming said blade into said recess channel and uniformly tensioning said blade, said improvement comprising said gasket including an outer sleeve and an inner filler ring located within said outer sleeve, said outer sleeve and said inner filler ring including means being constructed and arranged to permit relative movement between said outer sleeve and said inner filler ring.

2. A blade mounting and tensioning apparatus according to claim 1, said outer sleeve being constructed and arranged to be in contact with said fluid and said inner filler ring being constructed and arranged to be in contact with said blade, said outer sleeve and said inner filler ring being constructed and arranged to co-act upon pressurization of said fluid to seal said fluid within fluid channel.

3. A blade mounting and tensioning apparatus according to claim 1, said outer sleeve being constructed of a resilient material of a given durometer, said filler ring being constructed of a resilient material of a durometer different from the durometer of said outer sleeve.

4. A blade mounting and tensioning apparatus according to claim 1, said fluid channel being co-axial with said clamping members and including gasket retaining means, said outer sleeve being generally U-shaped in cross-section and including gasket retaining means for co-acting with said fluid channel gasket retaining means for retention of said sleeve within said fluid channel, said filler ring including means being constructed and arranged to permit axial movement thereof with respect to said outer sleeve.

5. A blade mounting and tensioning apparatus according to claim 1, said outer sleeve including an opening therein which is at least axially symmetrical, said inner filler ring having a cross-section which is at least axially symmetrical and which is of substantially the same size as the opening within said outer sleeve.

6. A blade mounting and tensioning apparatus according to claim 5 said fluid channel including gasket retaining means, said outer sleeve being generally rectangular in cross-section, said outer sleeve and said filler ring being constructed and arranged so that said filler ring is axially slideable within said outer sleeve.

7. A blade mounting and tensioning apparatus according to claim 4, said outer sleeve being arranged within said fluid channel with said U-shape sleeve opening toward said blade, said filler ring within said U-shape sleeve opening contiguous said blade.

8. An improvement in an annular mounting and tensioning apparatus for mounting and tensioning relatively thin deformable objects, said apparatus including annular clamping means for clamping the periphery of said object, an hydraulic fluid channel located radially inward of said clamping means, hydraulic fluid within said fluid channel, a deformable gasket located within said fluid channel radially inward of said clamping means, said gasket being constructed and arranged to seal said fluid within said fluid channel and axially bear against said object on one side thereof in response to pressurization of said fluid thereby deforming said object, means axially aligned with said gasket for accommodating said deformation of said object caused by said gasket bearing thereagainst, said improvement comprising said gasket including an outer sleeve and an inner filler ring, said outer sleeve and said inner filler ring including means being constructed and arranged so that said filler ring is movable axially relative to said outer sleeve.

9. An annular mounting and tensioning apparatus according to claim 8 said fluid channel including at least one annular groove therein, said outer sleeve being generally "U"-shaped in cross-section and including at least one annular projection constructed and arranged to co-act with said annular groove for retaining said outer sleeve within said fluid channel, said outer sleeve including an interior cavity having a given cross-section, said filler ring being located within said interior cavity and normally being substantially of the same cross-section as said cavity, said outer sleeve and said filler ring including means being constructed and arranged to co-act in response to pressurization of said fluid to deform thereby retaining said gasket within said fluid channel and sealing said fluid therein.

* * * * *